(12) United States Patent
Laudon et al.

(10) Patent No.: US 6,182,195 B1
(45) Date of Patent: Jan. 30, 2001

(54) SYSTEM AND METHOD FOR MAINTAINING COHERENCY OF VIRTUAL-TO-PHYSICAL MEMORY TRANSLATIONS IN A MULTIPROCESSOR COMPUTER

(75) Inventors: James P. Laudon, Menlo Park; Daniel E. Lenoski, San Jose, both of CA (US)

(73) Assignee: Silicon Graphics, Inc., Mountain View, CA (US)

( * ) Notice: Under 35 U.S.C. 154(b), the term of this patent shall be extended for 0 days.

(21) Appl. No.: 09/123,473

(22) Filed: Jul. 28, 1998

Related U.S. Application Data

(62) Division of application No. 08/435,459, filed on May 5, 1995, now Pat. No. 5,787,496.

(51) Int. Cl.[7] ............................................... G06F 12/00
(52) U.S. Cl. .............................. 711/141; 711/3; 711/118; 711/203; 711/210
(58) Field of Search .............................. 711/3, 118, 154, 711/210, 141

(56) References Cited

U.S. PATENT DOCUMENTS

| | | | |
|---|---|---|---|
| 4,141,067 | 2/1979 | McLagan | 395/468 |
| 4,481,573 | 11/1984 | Fukunaga et al. | 395/468 |
| 4,622,631 | 11/1986 | Frank et al. | 395/800 |
| 4,825,412 | 4/1989 | Sager et al. | 365/49 |
| 4,914,577 | 4/1990 | Stewart et al. | 395/417 |
| 5,214,770 | 5/1993 | Ramanujan et al. | 395/450 |
| 5,226,144 | 7/1993 | Moriwaki et al. | 395/468 |
| 5,228,136 | 7/1993 | Shimizu et al. | 395/468 |
| 5,282,274 | 1/1994 | Liu | 395/416 |
| 5,297,269 | 3/1994 | Donaldson et al. | 395/472 |
| 5,361,340 | 11/1994 | Kelly et al. | 395/403 |
| 5,398,325 | 3/1995 | Chang et al. | 395/468 |
| 5,406,504 | 4/1995 | Denisco et al. | 395/468 |
| 5,412,787 | 5/1995 | Forsyth et al. | 395/417 |
| 5,437,017 | 7/1995 | Moore et al. | 395/468 |
| 5,455,834 | 10/1995 | Chang et al. | 371/40.1 |
| 5,487,162 | * 1/1996 | Tanaka et al. | 711/141 |
| 5,493,660 | 2/1996 | DeLano et al. | 395/416 |
| 5,515,522 | 5/1996 | Bridges et al. | 395/468 |
| 5,530,933 | 6/1996 | Frink et al. | 395/468 |
| 5,588,131 | 12/1996 | Borill | 395/468 |

OTHER PUBLICATIONS

Patricia J. Teller, "Translation Lookaside Buffer Consistency", Jun. 1990, pp. 26–36.

Steven K. Reinhardt, "The Wisconsin Wind Tunnel: Virtual Prototyping of Parallel Computers", May 1993, pp. 48–60.

\* cited by examiner

*Primary Examiner*—Tuan V. Thai
(74) *Attorney, Agent, or Firm*—Sterne, Kessler, Goldstein & Fox P.L.L.C.

(57) ABSTRACT

A multiprocessor computer system and method for maintaining coherency between virtual-to-physical memory translations of multiple requestors in the system. A poison bit is associated with a memory block in the system. The poison bit is set to indicate that a virtual-to-physical memory translation for the memory block is stale. An exception is generated in response to an access by one of the requestors to the memory block if the poison bit is set, thereby indicating to the requestor that the virtual-to-physical memory translation entry for the memory block is stale. The virtual-to-physical memory translation for the memory block is then updated with a virtual memory translation corresponding to a new physical location for the memory block. In an embodiment having a cache-based multiprocessor system, the method further comprises the step of invalidating all cached copies of the memory block. In this case, the invalidating step and the setting step must be performed as an atomic operation.

22 Claims, 5 Drawing Sheets

SYSTEM AND METHOD FOR MAINTAINING COHERENCY OF VIRTUAL-TO-PHYSICAL MEMORY TRANSLATIONS IN A MULTIPROCESSOR COMPUTER

This application is a divisional application of, and claims priority to, U.S. patent application Ser. No. 08/435,459, filed May 5, 1995, now allowed, now U.S. Pat. No. 5,787,496

Additional, the following are related, commonly owned applications:

Directory-Based Coherence Protocol Allowing Efficient Dropping of Clean-Exclusive Data, U.S. patent application Ser. No. 08/435,460; now U.S. Pat. No. 5,680,527;

System and Method for Multiprocessor Partitioning to Support High Availability, U.S. patent application Ser. No. 08/435,462; now U.S. Pat. No. 5,991,895; and Cache Coherency Using Flexible Directory Bit Vectors, U.S. patent application Ser. No. 08/435,463; now U.S. Pat. No. 5,634,110;

The disclosures of the above applications are incorporated herein by reference.

BACKGROUND OF THE INVENTION

1. Field of the Invention

The present invention relates generally to a system and method for cache coherency, and more particularly to a system and method for maintaining coherency of virtual-to-physical memory translations in a multiprocessor computer.

2. Related Art

Maintaining the coherence of virtual translation caches (such as translations stored in translation-lookaside buffers (TLBs)) is usually handled in software rather than hardware in most distributed, shared-memory multiprocessors. This is based on a number of reasons.

Translation updates (i.e., TLB coherence actions) are much less frequent than updates to memory locations (normal memory coherence actions). These translation updates are often associated with paging, which also involves a relatively expensive read or write, or both to a disk. This disk access dominates the cost of maintaining coherence. Most memory pages are private to individual processes and processors so TLB updates can often be done by simply purging a translation entry in a single processor's TLB. In many architectures (including MIPS), translation table updates, which comprise loads and purges, are handled in software anyway, so it is more natural to handle TLB coherence in software as well.

It should also be noted that much of the cost of software TLB coherence in a multiprocessor is the need to synchronize (i.e., interrupt) all the processors who need to have entries in their TLB invalidated or updated.

In a large-scale non-uniform memory architecture (NUMA) many of these conditions do not hold. A NUMA computer system typically includes a plurality of processing nodes each having one or more processors, a cache connected to each processor, and a portion of main memory that can be accessed by any of the processors. The main memory is physically distributed among the processing nodes. In other words, each processing node includes a portion of the main memory. At any time, data elements stored in a particular main memory portion can also be stored in any of the caches existing in any of the processing nodes.

Most importantly, the NUMA architecture implies that translation may change due to migrating data from the memory of one node to a node that contains the processor referencing the data more frequently. This can cause the rate of translation updates to increase over traditional systems. Further, the non-TLB update costs decrease since the data moves only from one memory to another, not to disk. Thus, in a NUMA system it is desirable to have hardware acceleration of TLB coherence. Furthermore, since most processors (including all the MIPS processors) do not support TLB coherence in hardware, it is desirable for TLB coherence to be managed outside of the processor, and to remove the need for inter-processor synchronization in the updating of the TLBs.

There are a number of schemes that have been described in the literature for maintaining TLB coherence. (See Teller et al., "Translation-Lookaside Buffer Consistency", *IEEE Computer*, June 1990). Teller's TLB validation algorithm maintains a generation count in memory, which is incremented when a page table translation update is made. Along with each memory access, the processor includes its TLB copy of the generation count and memory compares these. If the two match, then the translation is valid and the access is validated. If the generation counts do not match, then the processor is notified to invalidate the appropriate TLB entry. An advantage of Teller's scheme is that it does not have problems reclaiming stale pages. When reused, the new translation starts with the next generation count for that physical page (frame is just another name for a page-sized portion of main memory). It does have a problem of needing to purge translations when a given generation counter overflows.

A bus error scheme is used in the Wisconsin Wind Tunnel (WWT) (Reinhardt et al., "The Wisconsin Wind Tunnel: Virtual Prototyping of Parallel Computers", ACM SIGMETRICS Conference Proceedings, May 1993) for triggering memory and coherence operations in software. In the WWT design, the error correction code (ECC) for a given memory word is corrupted to cause a bus error, which subsequently invokes software that maintains the illusion of coherent shared-memory on top of a message-passing system (i.e., a CM-5 computer: "Connection Machine CM-5: Technical Summary", Thinking Machines Corporation, November 1993). This scheme, however, is for cache coherency and does not address the problem of maintaining virtual-to-physical memory translations.

The problem not addressed by art is how to minimize costly synchronization of the processors. Thus, what is required is an improved mechanism to handle virtual-to-physical memory translations for maintaining coherency in a distributed computer system that results in minimal if any system performance degradation, and that requires minimal if any additional storage overhead.

SUMMARY OF THE INVENTION

The present invention is directed to a system and method for maintaining coherency between virtual-to-physical memory translations of multiple requesters in a shared-memory multiprocessor system.

A poison bit is associated with each memory block in the system. The poison bit is set when a virtual-to-physical memory translation for a memory block is stale.

A memory controller, or the like, associated with that memory block, generates an exception in response to an access by one of the requesters to the memory block if the poison bit is set. In a preferred embodiment, a requestor comprises a processor, input/output device, or the like. The exception indicates that the virtual-to-physical memory translation entry for the memory block is stale. In response to the exception, the requester updates its virtual-to-physical memory translation for the memory block with the virtual memory translation corresponding to a new physical location for the memory block.

The system may be a cached system or a non-cached system. An example of a cached system would include a cache in each processor. In this case, all cached copies of the memory block are invalidated when the poison bit is set. Preferably, the system supports a "poisoned read" operation that returns the current copy of a block while automatically setting the block's poison bit. The contents of the block can then be written to the new physical location. If the system supports caches, then the poison read would additionally invalidate all cached copies of the block at its old location.

The requestors can be a plurality of processors each with a cache memory and a translation-lookaside buffer to store virtual-to-physical memory translations. Alternatively, the requestors could also be input/output devices, or the like.

An advantage of the present invention over Teller is reduced memory overhead. According to the invention, only one state encoding is required (i.e., poison state), versus Teller's generation count and the need to send generation counts to memory.

An advantage of the present invention over the WWT approach is that WWT does not address TLB consistency at all. Their scheme is used to trigger cache coherency operations.

BRIEF DESCRIPTION OF THE DRAWINGS

The present invention will be described with reference to the accompanying drawings, wherein.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

The preferred embodiment of the invention is now described with reference to the figures where like reference numbers indicate identical or functionally similar elements. Also in the figures, the left most digit of each reference number corresponds to the figure in which the reference number is first used.

A block is a portion of memory that can range from a single storage location to an entire physical memory frame. A memory frame can store a page of data, which is referenced by a virtual addresses. The entire collection of virtual-to-physical address translations is called a page table. A translation-lookaside buffer, or TLB, is a cache of virtual-to-physical address translations and is associated with the processors and I/O devices that access memory using virtual addresses. A cache line is typically equated to the size of a memory block.

In this detailed description the term TLB is used in place of the phrase "virtual-to-physical memory translation." However, TLBs are not a requirement of the present invention per se, but are only an example of an implementation to organize virtual-to-physical memory translations. In the preferred embodiment, each computing node includes a TLB for managing virtual-to-physical memory translations.

In accordance with the present invention, associated with each memory block is a "poison" bit that indicates whether a given block is accessible. If the processor attempts to access a block when the poison bit for that block is set (e.g., has a value of logical "1"), then it receives a bus error and memory access status register, associated with the processor indicates that the bus error was due to accessing a block that was poisoned. Bus error exception software, upon reading the status register value, updates its virtual-to-physical memory translation with the new translation for the given page.

The term "poison bit" will be used throughout this application by way of example. An important aspect of the invention is that the system maintains some notion of a poison state. This state could be implemented as a dedicated bit or kept part of a block's state, as would be apparent to a person skilled in the relevant art.

The overall effect according to the present invention is that virtual-to-physical memory translation coherence is maintained without the very costly synchronization of the processors, that may have cached a translation for this page. Translation coherence is maintained in a lazy fashion, in which each processor updates its translation independently, and only if an access using a stale translation is attempted.

Figure 1:
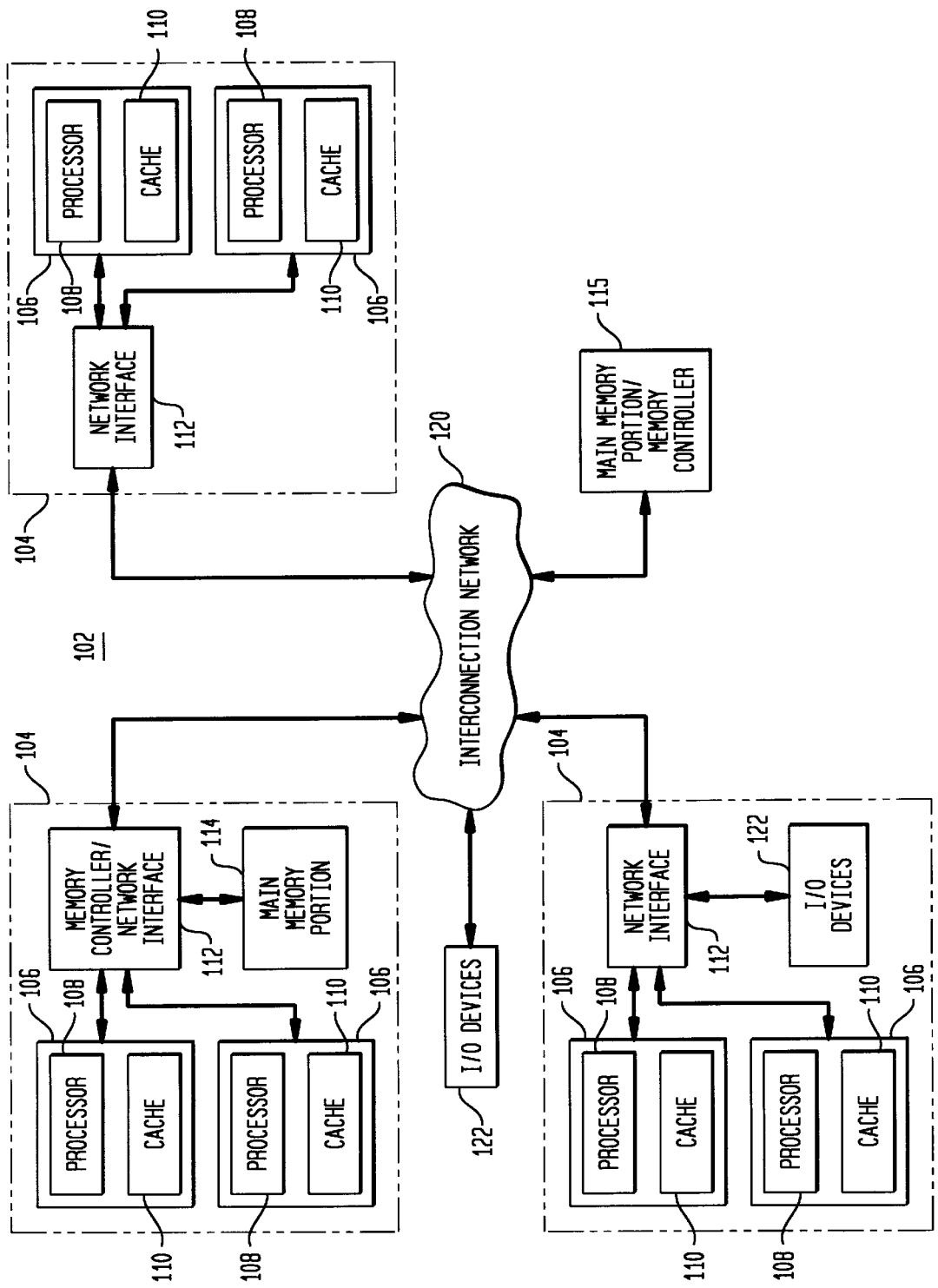
FIG. 1 is a block diagram of a distributed computer system according to a preferred embodiment of the present invention.

An exemplary block diagram of a distributed computer system 102 according to a preferred embodiment of the present invention is shown in FIG. 1. The distributed computer system 102 is preferably a distributed, nonuniform memory access (NUMA) computer system. The computer system 102 includes a plurality of processing nodes 104 (preferably 512 processing nodes 104), which are physically distinct and physically separated from one another. The processing nodes 104 communicate with each other over a communication network 120, representing a well-known data communication means, such as a bus, multistage interconnection network, local area network, wide area network, etc., or any combination of these.

System 102 includes one or more nodes. Each node contains a memory controller and network interface and optionally includes:

1) two processors with their associated caches,
2) a portion of main memory, and
3) I/O devices.

In the preferred embodiment all three are included, but the invention is not limited to this embodiment.

The portions of main memory 114 in all of the processing nodes 104 collectively represent the main memory of the computer system 102. Any processor 108 in any processing node 104 can access data stored in the portion of main memory 114 contained in any other processing node 104. Access to data contained in the portion of main memory 114 of any particular processing node 104 is controlled by the memory controller and network interface 112 contained in that same processing node 104, but is limited by the partitioning scheme disclosed in commonly-owned, copending U.S. patent application Ser. No. 1452.0630000115-4-193.00), titled System and Method for Multiprocessor Partitioning to Support High Availability.

At any time, data elements stored in any main memory portion 114 can also be stored in any of the caches 110 existing in the processing nodes 104. Requests for data are made by requesters, such as a processor 108, I/0 device 122, or the like. Each processing node 104 includes a directory-based cache coherency mechanism (not shown) to maintain the coherency of data stored in its main memory portion 114. The cache coherency mechanism preferably forms part of the memory controller and network interface 112 in the processing node 104. Similarly, partitioning, according to the present invention, is also managed by the memory controller and network interface 112.

A preferred embodiment of the directory-based protocol implemented by the memory controller and network interface 112 is described in commonly-owned, copending U.S. patent application Ser. Nos. 1452.0710000/15-4-204.00), titled Cache Coherency Using Flexible Directory Bit Vectors, and 1452.0620000/15-4-192.00), titled Directory-Based Coherence Protocol Allowing Efficient Dropping of Clean-Exclusive Data.

Figure 2:
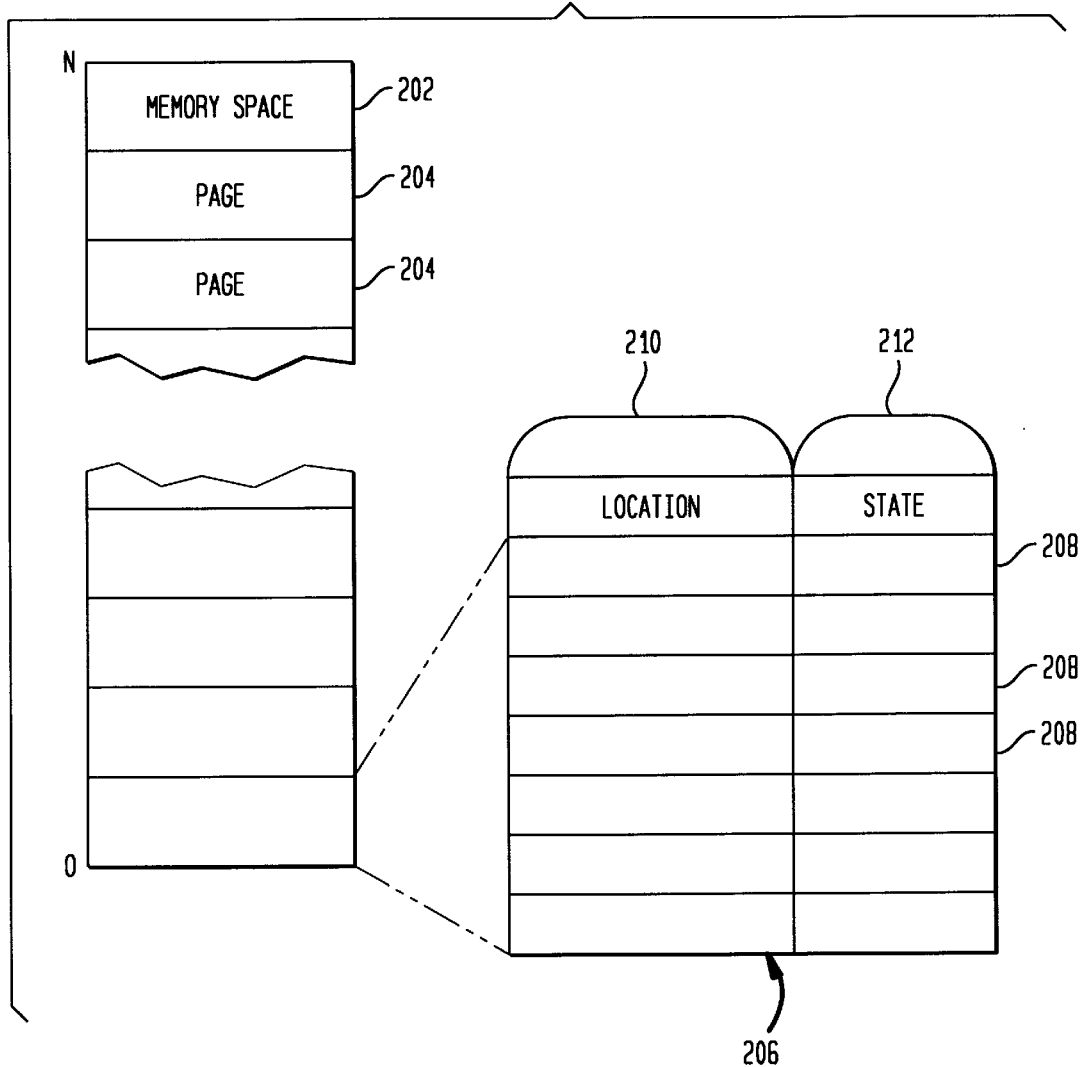
FIG. 2 is a schematic diagram of a portion of main memory space and corresponding directory information according to the present invention.

FIG. 2 shows a portion of the main memory space 202, separated into pages 204. Each main memory portion 114 stores N number of pages that are divided into memory blocks. According to the preferred embodiment of the present invention, a memory block is the size of a cache line for each block, which stores the caching state of the block, and pointers to the processors who are caching this block. A memory directory 206 has a corresponding multifield entry 208 for each block. A first bit field 210 points to the node (i.e., location) caching the corresponding block and the state (i.e., poison or not poison) of that block in a second bit field 212. If the poison bit is set (e.g., has a value of logical "1"), the corresponding virtual-to-physical memory translation is stale, and when it is not set, the translation is presumed valid. Further block state information to indicate whether the memory block is locked for atomic operation, so that the corresponding block can not be accessed. The lock on updating a page table entry in memory, for example, is a logical construct which is carried out either by a software algorithm or a hardware lock operation on a normal memory location.

Figure 3A:
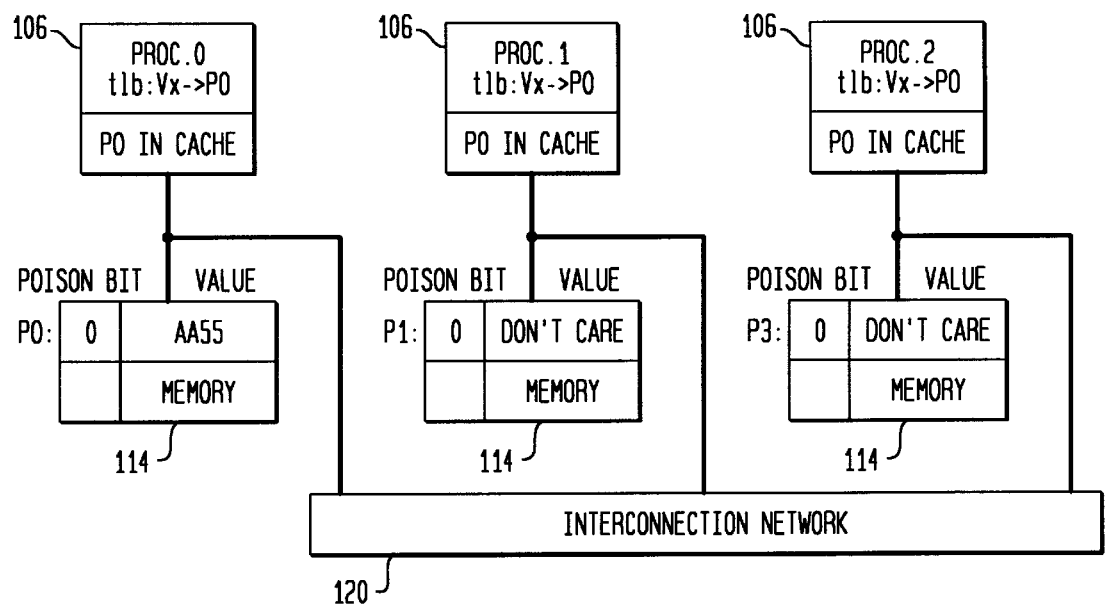
FIGS. 3A, 3B, 3C and 3D show an example of migrating a page and updating the associated TLB entries without global synchronization according to the present invention.

An example of how the poison bit is used for virtual-to-physical translations will be described with reference to FIGS. 3A–3D. These figures' operational/block diagrams show three nodes 106 (labeled Proc. 0, Proc. 1, and Proc. 2), three corresponding main memory portions 114, and an interconnection network 120. A TLB entry is shown by the designation "tlb:". In FIG. 3A, all processors' TLBs translate virtual address "Vx" to physical page P0. P0 is also cached by each processor in FIG. 3A. The value of P0 is AA55. The directory entries at P1 and P3 of the memories associated with Proc. 1 and Proc. 2, respectively, are shown as "don't care" since their value at this stage is not relevant to the example.

Figure 3B:
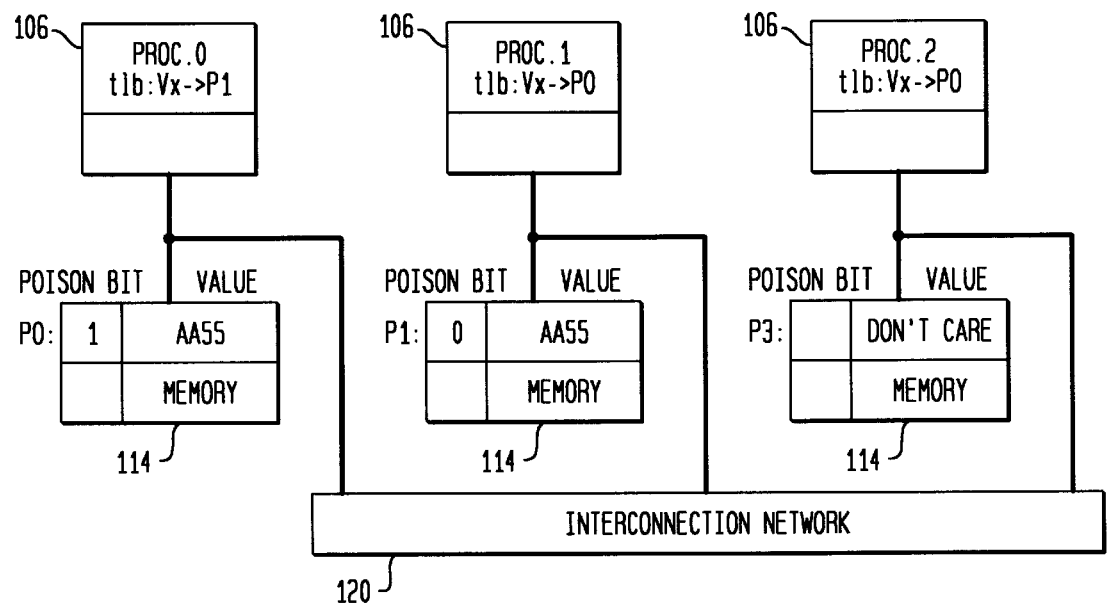

In FIG. 3B, Proc. 0 executes a copy of P0 to location P1, which set the poison bit for P0 to a logical "1", and location P0 is purged from the caches of all three processors. After the move is complete, Proc. 0 also updates the page table and its TLB entry so that Vx points to P1.

The setting of the poison state while reading the current value of the location should be an atomic operation, unless the process setting the poison state can read the location after it has been poisoned.

Figure 3C:
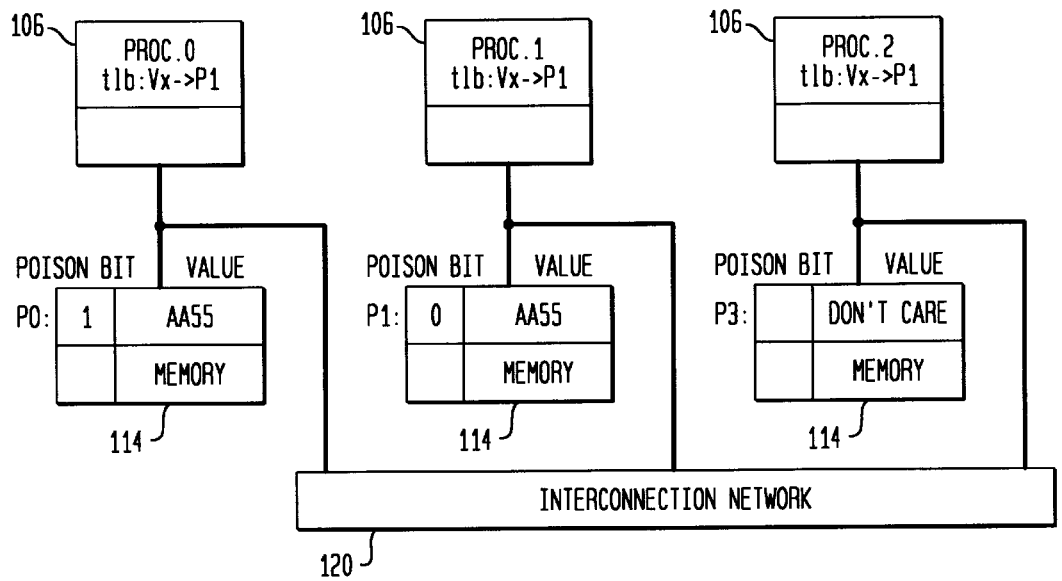

If Proc. 1 and Proc. 2 use their stale TLB translation, they must first go to memory since the move itself invalidated their cache copies of P0. They receive a bus error from memory and an indication that the bus error was caused by a poison access, access to P0. This causes Proc. 1 and Proc. 2 to update their TLB translation for Vx (asynchronously to one another), as shown in FIG. 3C.

Figure 3D:
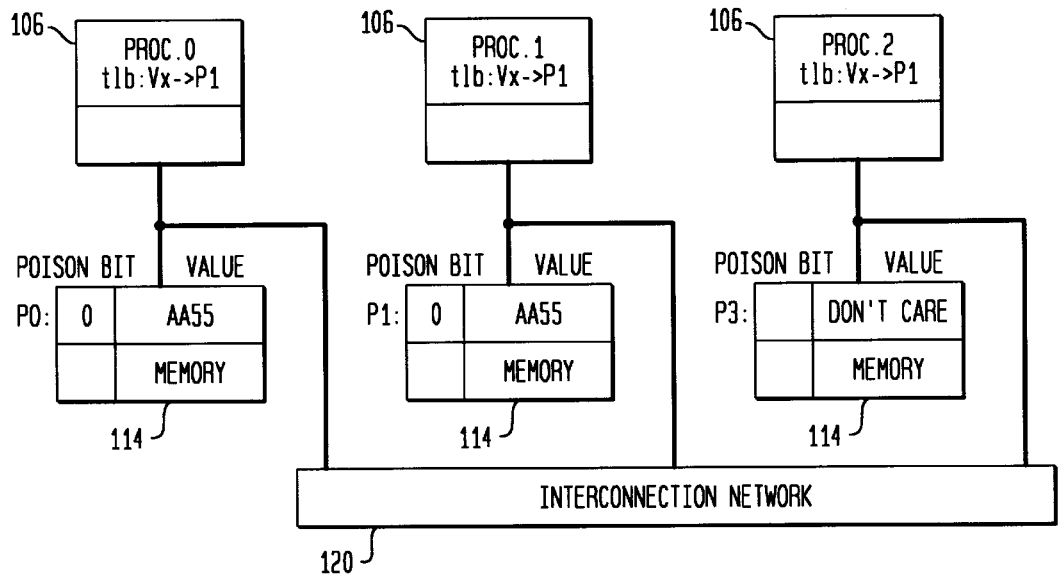
Figure 4:
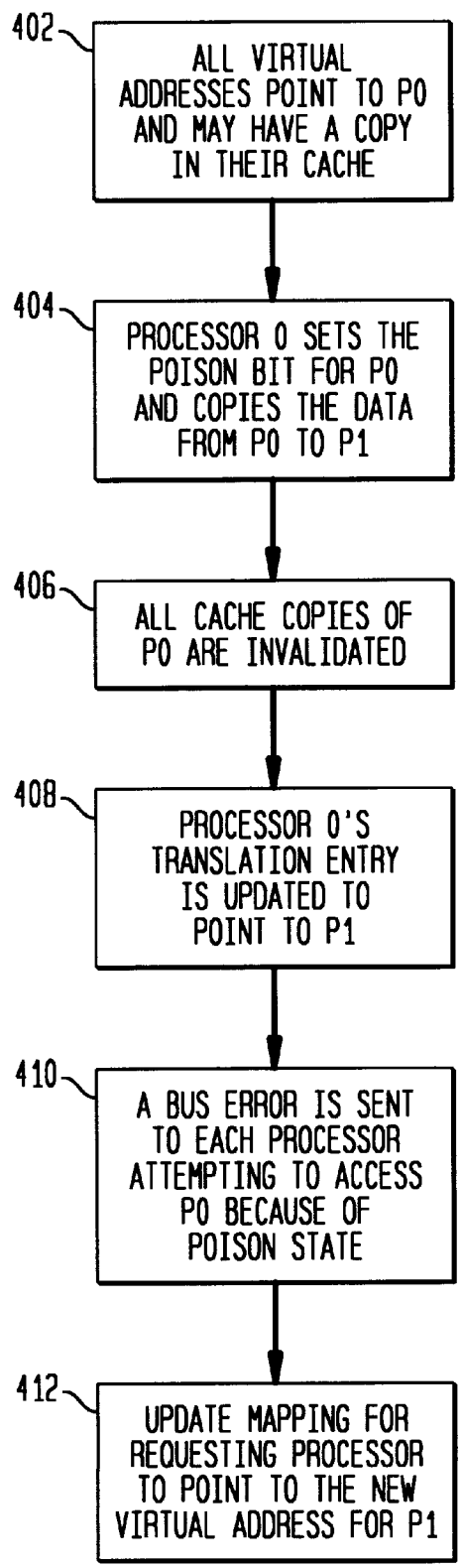
FIG. 4 is a flow diagram representing the operation of the present invention.

Finally, when it can be guaranteed that there are no longer any stale TLB entries for P0, the P0 frame can be reused and its poison bit reset (e.g., to 0), as shown in FIG. 3D. Conventional page re-use algorithms can be used as would be apparent to a person skilled in the relevant art. A flow diagram summarizing the steps described above in connection with FIGS. 3A–D is shown in FIG. 4. Step 404, however, includes both reading the page and copying it to the new location. Updating of stale translations in done asynchronously on a per-processor basis as attempts are made to access the poison state. This is therefore called a "lazy" TLB coherence scheme. Essentially, requestors individually determine that their translations are stale when they asynchronously access the page and get bus errors due to the poison state.

While this basic scheme would be sufficient to build a lazy TLB coherence scheme, there are a number of extensions to improve performance and deal with the caching of data. The first issue is that if cached copies of the page are not purged before the memory block is poisoned, it is possible for a processor to continue referencing the page from its cache without ever accessing the poison state stored in main memory. To solve this problem, the inventors have added an operation that forces the current value of a cache line back to main memory, invalidates any cached copies of the block, and sets the poison bit. Theoretically, this operation could be issued by the processor, but in a preferred embodiment of the present invention, this operation is supported by the block transfer controller, which is simultaneously copying the block to a new node. The block transfer controller functions as a DMA controller that is specialized for doing memory to memory copy and fill operations.

Thus, once the copy is completed and page tables updated, others can immediately start using the block without any global TLB coherence operations. Subsequently, any processor with a stale TLB translation will access the poison state at the old memory location and update their TLBs before using the stale data. Note that it is also safe to be referencing the old page even when the copying is going on, but this does imply that the flush and set poison operation must interact with other potential coherence operations.

Another issue with fully utilizing the poison (bit) state is that the system must ensure that all old translations of a page are purged before the poison bits for a page are reset. Since entire TLBs are flushed on a regular basis anyhow (e.g., due to reuse of process identifiers in the TLB), this is guaranteed by simply time-stamping these flushes, and guaranteeing that such a flush had happened on all processors that might have a stale TLB translation before reclaiming the poisoned page. Other software, firmware, or hardware mechanisms can be envisioned that would amortize any global synchronization required with such reclaiming over multiple pages.

Thus, an advantage of the poison bit is that overhead in the memory is reduced (one bit compared with n-bit binary number), and there is no need to modify the processor to maintain and transmit the generation count. As with Teller, the WWT does not address the issue of forcing all potentially cached copies of the block back to memory, nor does it support any ties between the poison state and doing block copies.

As stated before, given the non-uniform access time of a DSM (distributed shared memory) system, it becomes desirable to migrate memory close to the processors with which it is being used. Since, in the preferred embodiment, this amounts to a 16 KB memory to memory move, and such moves can occur in 10–30 μsec, the overhead of maintaining TLB coherence can dominate the costs of such a migration (traditional TLB coherence can cost 80–100 μsec). A mechanism to maintain TLB coherence, such as the poison state, is critical in keeping the costs of such migration down.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, the poison bit scheme could be used in a system that does not employ cache coherence. The only difference would be that there would be no need to purge cached copies when setting the poison bit. Thus, the present invention should not be limited by any of the above-described exemplary embodiments, but should be defined only in accordance with the following claims and their equivalents. All cited patent documents and publications in the above description are incorporated herein by reference.

What is claimed is:

1. A multiprocessor computer system supporting memory page migration, comprising:

a plurality of nodes each having
   (a) at least one processor,
   (b) a cache memory associated with the processor,
   (c) a portion of memory that can be accessed by multiple requestors located within any of the plurality of nodes, wherein said portion of memory is organized in pages comprising memory blocks, wherein each of said memory blocks has an associated poison state; and
   (d) a memory controller that maintains coherency between virtual-to-physical translations of said multiple requestors in the system, wherein said controller
      sets a first poison state for a first one of said memory blocks when a virtual-to-physical memory translation for said first one of said memory blocks is stale, and
      generates an exception in response to an access by one of said multiple requestors to said first one of said memory blocks if said first poison state is set, thereby indicating that said virtual-to-physical memory translation for said first one of said memory blocks is stale,
      wherein another one of said multiple requestors ascertains that said virtual-to-physical memory translation for said first one of said memory blocks is stale if said another one of said multiple requestors attempts to access said first one of said memory blocks while said first poison state is set.

2. The multiprocessor computer system according to claim 1, wherein each node further comprises a translation-lookaside buffer (TLB) for caching virtual-to-physical memory translations.

3. The multiprocessor computer system according to claim 1, further comprising means for invalidating all cached copies of said first one of said memory blocks.

4. The multiprocessor computer system according to claim 3, wherein said invalidating and said setting are performed as an atomic operation.

5. The multiprocessor computer system according to claim 1, further comprising means for copying said first one of said memory blocks to a new physical location.

6. The multiprocessor computer system according to claim 5, further comprising means for setting a lock bit in a memory directory to lock said virtual-to-physical memory translation during said copying.

7. The multiprocessor computer system according to claim 1, wherein said multiple requesters include each of said plurality of node's at least one processor.

8. The multiprocessor computer system according to claim 1, wherein said multiple requestors include input/output devices.

9. The multiprocessor computer system according to claim 1, further comprising logic that sets a first poison bit in a memory directory to indicate that said first poison state is set.

10. The multiprocessor computer system according to claim 1, further comprising a memory directory having a first poison bit field, wherein said first poison bit field is used to indicate whether said first poison state is set.

11. The multiprocessor computer system according to claim 1, further comprising a block transfer controller to invalidate all cached copies of said first one of said memory blocks.

12. The multiprocessor computer system according to claim 1, further comprising a block transfer controller for copying said one of said memory blocks to a new physical location.

13. The multiprocessor computer system according to claim 12, further comprising a memory directory having a lock bit field, wherein said lock bit field is used to lock said virtual-to-physical memory translation during said copying.

14. In a multiprocessor computer system supporting memory page migration and including a plurality of nodes each having at least one processor, a cache memory associated with the processor, and a portion of memory that can be accessed by multiple requesters located within any of the plurality of nodes, wherein said portion of memory is organized in pages comprising memory blocks, wherein each of the memory blocks has an associated poison state, a method for maintaining coherency between virtual-to-physical translations of multiple requestors in the system, comprising the steps of:

setting a first poison state for a first one of the memory blocks when a virtual-to-physical memory translation for said first one of the memory blocks is stale; and
   generating an exception in response to an access by one of the requesters to said first one of the memory blocks if said first poison state is set, thereby indicating that the virtual-to-physical memory translation for said first one of the memory blocks is stale,
   wherein another one of said multiple requestors ascertains that said virtual-to-physical memory translation for said first one of said memory blocks is stale if said another one of said multiple requestors attempts to access said first one of said memory blocks while said first poison state is set.

15. The method according to claim 14, wherein each node further comprises a translation-lookaside buffer (TLB) for caching virtual-to-physical memory translations.

16. The method according to claim 14, further comprising the step of invalidating all cached copies of said stale memory block.

17. The method according to claim 16, wherein said setting and said invalidating steps are performed as an atomic operation.

18. The method according to claim 14, further comprising the step of copying said first one of the memory blocks to a new physical memory location.

19. The method according to claim 18, further comprising the step of setting a lock bit in a memory directory to lock the virtual-to-physical memory translation during said copying step.

20. The method according to claim 14, wherein said access by one of the requestors in said generating step, is performed by one of the plurality of node's at least one processor.

21. The method according to claim 14, wherein said access by one of the requestors in said generating step, is performed by an input/output device.

22. The multiprocessor computer system according to claim 14, further comprising the step of setting a first poison bit in a memory directory to indicate that said first poison state is set.

* * * * *